June 24, 1947.  C. W. H. MINCHIN ET AL  2,423,040
DYNAMO-ELECTRIC MACHINE
Filed Oct. 3, 1944
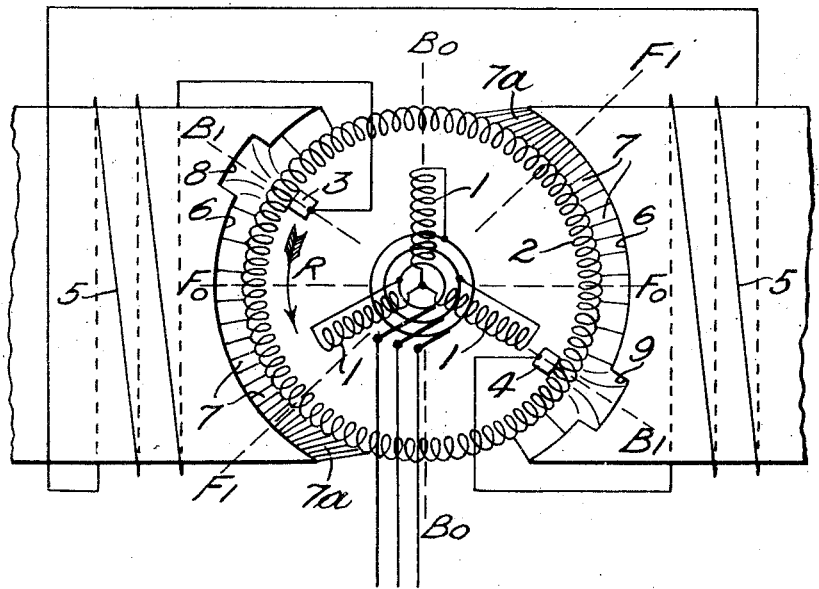
Inventors.
Cecil William Haviland Minchin
Arthur James Parsons
Peck & Peck
Attorneys Patented June 24, 1947

2,423,040

UNITED STATES PATENT OFFICE 2,423,040

DYNAMOELECTRIC MACHINE

Cecil William Haviland Minchin and Arthur James Parsons, Dursley, England, assignors to Mawdsley's Limited, Dursley, England, a company of Great Britain Application October 3, 1944, Serial No. 556,960
In Great Britain October 7, 1943

5 Claims. (Cl. 171—241)

This invention concerns dynamoelectric machines of the general type (hereafter referred to as the type specified) in which a single armature, which carries both alternating current and direct current windings, rotates between the poles of a direct current exciting field system. The two windings may be entirely separate, each having its own slots on the armature, or they may share the same slots. Alternatively, the two windings may be combined into a single winding, the alternating current output being picked up from slip rings to which the winding is connected in the usual manner of alternating current machines, while the direct current output is picked up from a commutator, each segment of which is connected to a tapping on the windings. More particularly the invention concerns self-excited alternators, in which the armature is driven by a prime mower to supply an alternating current output, the direct current power taken from the commutator being used to excite the field windings.

In a self-excited alternator, if the alternating current winding is to generate a constant terminal voltage at all loads, the excitation of the field must be varied to compensate for the internal voltage drop due to armature impedance and for the variation of armature reaction. In general, when the alternating current power is generated at constant terminal voltage, constant speed and constant lagging power factor, a greater direct current excitation current is required with increasing load. When the direct current brushes are set in the neutral position, this greater direct current excitation current is obtained by decreasing the resistance of the field regulator. If, however, the alternator is automatically to maintain a constant alternating current terminal voltage, it is necessary to obtain from the commutator a direct current voltage which will increase with increasing load in proportion to the increase with excitation current required. In the self-excited alternator of this type, with the brushes set in the neutral position, there will be an inherent increase of the direct current voltage under the above conditions proportional to the increase in the internal alternating current voltage. This increase, however, is insufficient to compensate for the extra ampere turns required for magnetic saturation and the armature reaction of the alternating current winding.

A greater proportional increase of direct-current voltage can be obtained by taking advantage of the shift or distortion of the exciting flux due to the armature reaction of the alternating current. If the direct current brushes are made capable of being moved forward with rotation under no-load conditions, the effective flux which cuts the direct current winding will be less than the flux which was cutting it when the brushes were in the neutral position, and the voltage of the brushes will be proportionally reduced. When the machine is on load, however, the effective flux cutting the direct current winding will be greater than when on no load due to the distortion of the main field by the armature reaction of the alternating current winding. The armature reaction of the direct current winding, with forward brush shift, will partly oppose the main field but when the direct current output for excitation is small compared with the alternating current output, this opposing magneto motive force will be almost negligible. By a suitable amount of forward movement of the direct current brushes the correct ratio of direct current voltage necessary between no load and full load conditions can be obtained, and with field coils wound to suit the reduced voltage the correct ampere turns on the field will be given without movement of the field regulator.

In the specification of our prior British Patent No. 548,840 there is described a self-excited alternator, being a dynamoelectric machine of the type specified, in which one or more of the direct current brushes supplying the main field excitation is or are arranged to be movable away from the neutral brush axis and set in predetermined optimum position for the purpose of varying the direct current voltage as the alternating current load on the machine increases so as to provide automatic control of the field excitation. In the case of an alternator loaded at lagging power factor, the variation of the direct current voltage is in the increasing direction but if loaded at leading power factor a decrease of direct current excitation may be required.

If a uniform air gap between the pole shoe and armature surface is employed the forward movement of the brushes will result in commutation of the direct current excitation current being made at a position where the voltage between the communtator bars may cause sparking under the brushes. Sparking is reduced to a minimum if the voltage between the leading and lagging edge of the brush is reduced to less than 2 volts. This may be accomplished by arranging the armature winding to generate a low voltage, or by employing a large number of commutator bars. Both methods tend to produce low voltage between any two adjacent commutator bars. The sparking may also be reduced by using a narrow brush on the commutator to span the least number of commutator bars consistent with the current carrying capacity of the brush. This tends to reduce the voltage and the current circulating between the leading and trailing edges of the brush.

It is the object of the present invention to provide a machine of the type specified in which automatic control of the field excitation is effected.

The voltage between adjacent commutator bars may be reduced by increasing the air gap between the pole shoes and armature surface at the position in the pole shoes which covers the direct current armature conductors under commutation. Such increased air gap reduces the flux density at this position with the result that the voltage between adjacent bars at the moment of commutation is lower than would be the case at that position with a uniform air gap.

According to the present invention a self excited alternator, being a dynamoelectric machine of the type specified has one or more of the direct current brushes supplying the main field excitation arranged to be movable away from the neutral brush axis and set in predetermined optimum position for the purpose of enabling the alternating current armature reaction suitably to vary the direct current voltage as the alternating current load on the machine increases and a greater air gap between a pole face or the pole faces and the armature surface at a position or the positions where the direct current armature conductors are under commutation.

In the accompanying drawing which is a schematic representation of the circuit of a two-pole self-excited alternator according to the invention, the armature is shown as having two separate windings, 1, 2, the winding 1 being a three-phase winding, the phases of which are connected in the normal way to three slip rings. From these slip rings is taken the alternating current power output of the machine. The winding 2 is a continuous direct current winding connected in the normal way to a commutator (not shown), the brushes being shown conventionally at 3 and 4. The brushes are connected to the alternator field winding 5.

In the diagram, the alternator is assumed to be rotating in the direction of the arrow R, and to be supplying a load on the alternating current slip rings. The corresponding flux distribution is indicated by the short lines 7 between the pole faces 6 and the armature, the distorting effects of the armature reaction being indicated by the "bunching" of the flux at the points 7a. The axis of the main flux is thus moved angularly from the no load position $F_0$—$F_0$ to the position $F_1$—$F_1$, and in order to take account of this shift the brushes are mounted so as to be movable from their neutral axis $B_0$—$B_0$ to the position $B_1$—$B_1$. The position $B_1$—$B_1$ is an optimum position determined by trial and the brushes after adjustment would be fixed in this position. Should the normal power factors of the load be altered, the brushes may be moved, either by hand or automatically, to the new appropriate position.

It may be mentioned that with a self-excited alternator having a given field winding, there is an optimum position at which, if the direct current brushes are adjusted to it and there fixed, the machine will generate almost constant terminal voltage over a wide range of load at a set power factor and constant speed.

8, 9 are slots extending across the pole faces 6, 6 at the positions where the armature conductors of the direct current winding 2 are under commutation, i. e. where the brushes 3, 4 are in the optimum position. These slots provide a greater air gap at such positions. The slots may be, for example, ½" deep.

In operation as the load on the machine increases the direct current voltage at the brushes 3, 4 will increase and thus increase the field to compensate for the internal voltage drop due to armature impedance and for variation of armature reaction so that the alternating current terminal voltage will remain constant for all loads.

The increased air gap provided by the slots 8, 9 causes the flux density of the field in the air gap at these points to be reduced with consequent reduction of the voltage between adjacent commutator bars at the moment of commutation and reduction of sparking.

What we claim is:

1. A self-excited alternator comprising a fixed field magnet system, a direct current exciting winding therefor, an armature mounted to rotate between the poles of the field magnet system, an alternating current winding on the armature, slip rings to which said winding is connected, a direct current winding on the armature, a commutator to which said winding is connected, brushes on the commutator connected to the exciting winding a brush being movable and set away from the neutral brush axis in a predetermined optimum position for the purpose of enabling the alternating current armature reaction suitably to vary the direct current voltage as the alternating current load on the machine increases, and a greater air gap between a pole face and the armature where the direct current conductors are under commutation.

2. A self excited alternator comprising a fixed field magnet system, a direct current exciting winding therefor, an armature mounted to rotate between the poles of the field magnet system, an alternating current winding on the armature, slip rings to which said winding is connected, a direct current winding on the armature, a commutator to which said winding is connected, brushes on the commutator connected to the exciting winding movable and set away from the neutral brush axis in a predetermined optimum position for the purpose of enabling the alternating current armature reaction suitably to vary the direct current voltage as the alternating current load on the machine increases and a greater air gap between a pole face and the armature where the direct current conductors are under commutation.

3. A self-excited alternator comprising a fixed field magnet system, a direct current exciting winding therefor, an armature mounted to rotate between the poles of the field magnet system, an alternating current winding on the armature, slip rings to which said winding is connected, a direct current winding on the armature, a commutator to which said winding is connected, brushes on the commutator connected to the exciting winding, a brush being movable and set away from the neutral brush axis in a predetermined optimum position for the purpose of enabling the alternating current armature reaction suitably to vary the direct current voltage as the alternating current load on the machine increases, and a slot extending across a pole face where the direct current conductors are under commutation.

4. A self-excited alternator comprising a fixed field magnet system, a direct current exciting winding therefor, an armature mounted to rotate between the poles of the field magnet system, an alternating current winding on the armature, slip rings to which said winding is connected, a direct current winding on the armature, a commutator to which said winding is connected, brushes on the commutator connected to the exciting winding, set away from the neutral brush axis in a predetermined optimum position for the purpose of enabling the alternating current armature reaction suitably to vary the direct current voltage as the alternating current load on the machine increases, and a slot extending across a pole face where the direct current conductors are under commutation.

5. A self-excited alternator according to claim 1 wherein the alternating current and direct current windings on the armature are combined in a single winding.

CECIL WILLIAM HAVILAND MINCHIN.
ARTHUR JAMES PARSONS.

REFERENCES CITED

The following references are of record in the file of this patent:

UNITED STATES PATENTS

| Number | Name | Date |
|---|---|---|
| 869,187 | Latour | Oct. 22, 1907 |
| 1,211,803 | Woodbridge | Jan. 9, 1917 |